United States Patent
Rosenlund

[11] 3,904,374
[45] Sept. 9, 1975

[54] EXHAUST GAS REACTOR SUPPORTING PINS

[75] Inventor: Iver Theodore Rosenlund, Kennett Square, Pa.

[73] Assignee: E. I. Du Pont de Nemours and Company, Wilmington, Del.

[22] Filed: Feb. 14, 1973

[21] Appl. No.: 332,504

[52] U.S. Cl............ 23/277 C; 285/133 R; 285/187; 165/82; 60/322
[51] Int. Cl............................................. F01n 3/10
[58] Field of Search .. 23/288 F, 284, 277 C, 288 K; 285/133 R, 187, 322; 165/82

[56] References Cited
UNITED STATES PATENTS

| | | | |
|---|---|---|---|
| 2,776,875 | 1/1957 | Houdry | 23/288 F |
| 3,083,083 | 3/1963 | Boysen | 23/288 F |
| 3,505,028 | 4/1970 | Douthit | 23/277 C |
| 3,633,368 | 1/1972 | Rosenlund | 23/277 C X |
| 3,740,197 | 6/1973 | Scheitlin et al. | 23/288 F |
| 3,751,920 | 8/1973 | Rosenlund | 23/277 C X |

Primary Examiner—James H. Tayman, Jr.
Attorney, Agent, or Firm—James A. Costello

[57] ABSTRACT

Supporting pins for an exhaust gas reactor which reactor comprises a reactor chamber mounted by the supporting pins inside an enclosing shell. The pins are anchored in the shell and fit slidably into the reactor chamber which chamber has freedom to slide along the pins.

1 Claim, 2 Drawing Figures

3,904,374

EXHAUST GAS REACTOR SUPPORTING PINS

BACKGROUND OF THE INVENTION

1. Field of the Invention

This invention concerns an exhaust gas reactor having a reactor chamber enclosed by a shell and supporting pins for mounting the chamber within the shell. The reactor is such as is known in the art (but without the improvement described herein) to be useful in reducing the concentration of hydrocarbons and carbon monoxide in the exhaust gas from internal combustion engines.

2. Description of the Prior Art

Exhaust gas reactors in which mixtures of hot internal combustion engine exhaust gases and supplementary air are reacted to reduce their carbon monoxide and hydrocarbon content by oxidation are known. Such reactors are typified by U.S. Pat. No. 3,413,803, Rosenlund et al., U.S. Pat. No. 3,486,326, Hermes et al., and U.S. Pat. No. 3,633,368, Rosenlund. They disclose cylindrical reactor chambers coaxially aligned with concentric outer shells by axial pins extending through the chambers and shells which pins are anchored in the chambers and positioned slidably in the shells.

Reactor chambers often fail because they are axially squeezed and stretched during temperature changes by binding of the pins in nominally sliding fits. Because chamber metal is relatively weak at reactor operating temperatures, some stiffening of pin achorage and alignment is required on the chamber. When these chambers are hot, they expand the pins at their slide fit ends in the relatively cooler bearings of the shell ends. When reactor chambers warp during reactor operation because they receive a series of injections of hot exhaust gas, normally not in a side-by-side sequence, the strengthened pin anchorages cause pins to cock in their bearings and thus resist slip.

When reactor chambers are subject to cooling because of engine shutdown, their midportions, no longer heated, contract before cooling and thermal contraction of the pins occurs, often causing the chambers to tug at the shells until pins loosen. The sum of these binding effects often works the chambers into failure.

SUMMARY OF THE INVENTION

This invention concerns an improvement in an exhaust gas reactor system and an improvement in a process therefor. In an elongated exhaust gas reactor in which an elongated reactor chamber is mounted within a surrounding shell by supporting pins that are aligned axially and that connect the chamber to the shell at their ends, the reactor having exhaust gas inlets extending through the shell and into the chamber, the improvement which comprises pins that are anchored, i.e. unslidably attached, to the shell and that are positioned slidably into the reactor chamber. The pins can be wholly or partially hollow to serve as gas inlets providing communication between the reactor chamber interior and the reactor shell exterior.

The novel process step is an improvement in the process for making an elongated exhaust gas reactor comprising mounting an elongated reactor chamber within a surrounding shell by means of supporting pins that are aligned axially and that connect the chamber to the shell at their ends, and extending exhaust gas inlets through the shell and into the chamber, the improvement comprising anchoring the supporting pins to the shell and positioning the pins slidably into the reaction chamber.

Pins are "aligned axially" when they are on a common axis which common axis need not coincide with the axis of the reactor chamber.

DETAILS OF THE INVENTION

The exhaust gas reactors of this invention have elongated reactor chambers surrounded by enclosing shells which generally allow for an airspace between chamber and shell. The chamber is connected to the shell by pins aligned on a common axis and anchored in the ends of the shells and fit slidably into the ends of the chambers far enough to remain there at all reactor operating temperatures.

Major movement of the chamber along and around the shell axis is limited chiefly by structural means between the chamber and the shell other than at the chamber ends. Such means can be, for example, pins or rods which extend through the chamber and shell across their axis, ridges which bias the relative positions of chamber and shell by snap action or, preferably, exhaust gas inlet ducts which extend through the shell and into the chamber.

Figure 1:
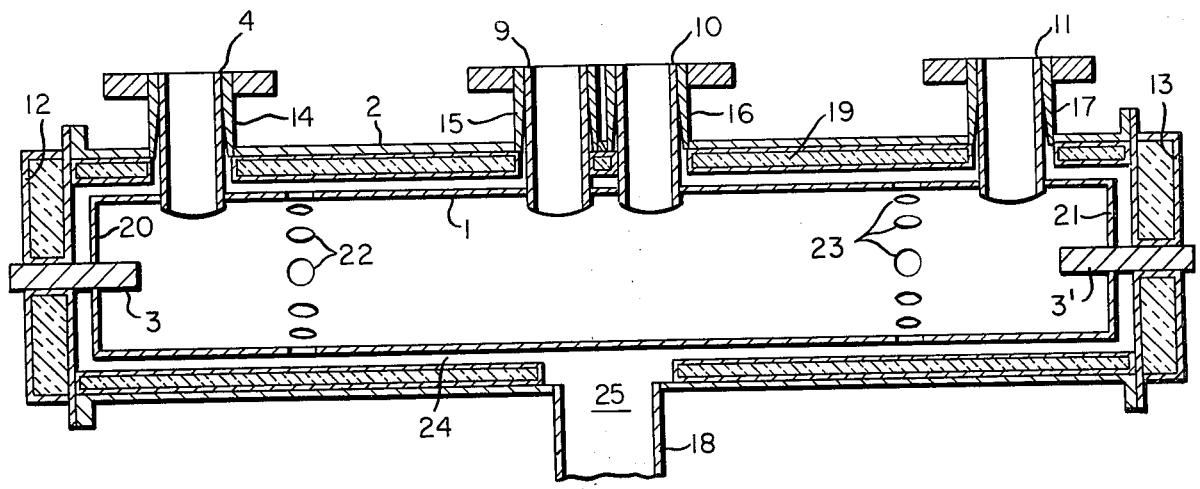
FIG. 1 is a section along the axis of a type of exhaust gas reactor in which this invention is useful.

In FIG. 1, the reactor comprises cylindrical chamber 1 having end closures 20 and 21 and shell 2 having end closures 12 and 13. Axial pins 3 and 3' are centrally anchored in closures 12 and 13, such as by welds, and fit slidably in central holes of closures 20 and 21. Liner 19 insulates shell 2 against undue heat loss. Annulus 24 provides an exhaust gas flow passage between chamber 1 and shell 2. Exhaust gas inlet pipes 4, 9, 10 and 11 extend into chamber 1 and are enclosed by flanged shell extensions 14, 15, 16 and 17. Chamber 1 is provided with 2 rings of holes 22 and 23 allowing exit of exhaust gas into annulus 24 and out through exit opening 25 via outlet pipe 18. It should be understood that contemplated reactor embodiments can have a dead air space between chamber 1 and shell 2.

During reactor operation, chamber 1 heats up faster and more than shell 2 and lengthens faster than shell 2, and the different length changes cause chamber 1 at closures 20 and 21 to slide on pins 3 and 3' toward shell ends 12 and 13. During reactor operation, the ability of closures 20 and 21 to slide on pins 3 and 3' is enhanced in that they heat quickly in response to exhaust gas heat while the pins are somewhat cooled by closures 12 and 13 to which they are anchored, resulting in easy slip fit.

At the end of reactor operation, chamber 1 quickly approaches the temperature and length of shell 1 with the benefit of its thermally enlarged end closure holes, and thereafter little stresa on slidable fits can result from further cooling of both the chamber and shell.

Figure 2:
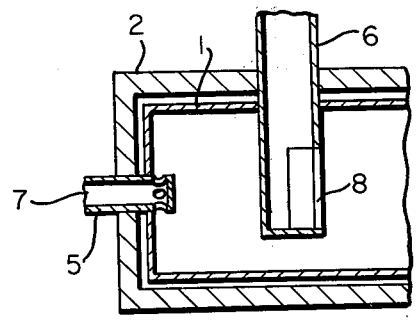
FIG. 2 is a section through the axis of an exhaust gas reactor embodiment employing the supporting pins additionally as gas inlets. It should be noted that the supporting pins in FIGS. 1 and 2 are fit slidably into the reactor chamber although the drawings do not show the rather minute space around the pins and between the pins and the perimeter of the surrounding hole in the end of the reactor chamber.

In FIG. 2, pin 5 is also in the common axis of chamber 1 and shell 2. It is fixed in shell 2 and slidably fits in chamber 1. It has a central passage 7 communicating with outlet holes and is adapted to conduct oxidizing gas, e.g. air, into chamber 1. As in FIG. 1, exhaust gas pipe 6, inserted through holes in shell 2 and chamber 1 provides major alignment of chamber 1 along the axis of shell 2 and has opening 8 for engine exhaust gases into chamber 1.

Pins are fixed in the shells by any suitable means so long as they allow axial freedom of the reactor chambers on them. Anchorage can be by any method which fixes pins against axial movement in the shells, such as by collars, optionally with seals, or, preferably, by welding.

A typical way to make an exhaust gas reactor having the disclosed supporting pins therein follows: A cylindrical reactor tube is fabricated of stainless steel tubing. Four holes are made along its axis to receive exhaust gas inlets and one or more peripheral holes are made in it where exhaust gases can escape. Circular chamber plates of stainless steel having central pin mounting holes of diameter $d$, and optionally alternate or added chamber exhaust holes are welded on the ends of the chamber tube.

A cylindrical shell, of a diameter sufficient to enclose the chamber with an annulus between the chamber and shell, is fabricated of stainless steel tube and provided with an outlet opening and inlet holes which will align with exhaust gas inlets of the chamber. Flanged extensions of the shell from the inlet holes, having internal diameters larger than the chamber inlet holes, are welded radially on the shell. A flanged outlet pipe is welded to the shell outlet opening.

Circular shell end plates are fabricated of stainless steel plate, each provided with a central hole of diameter $d$. A stainless steel cylindrical pin of diameter near $d$ which is a slip fit into a chamber end plate and is of sufficient length is sealably welded in each shell end plate so that its slip fitting end projects from the plate.

A shell end plate is sealably secured to a shell tube end with the pin pointing inside. The chamber is inserted so that the chamber end plate slips over the pin end and the exhaust gas inlet holes are aligned.

Four stainless steel inlet pipes of sufficient length and diameters closely fitting the chamber inlet holes are inserted in the flanged extensions until they reach inside the chamber and then are fixed flush with the extension flanges.

The other shell end plate is positioned on the other shell tube end with its pin slipping into the other chamber end plate and sealably secured to the other shell tube end.

Obvious variations in reactor design, provision of shell insulation and method of assembly will occur to those skilled in the art while benefiting from the design of this invention.

Using the description supplied herein it will be easy for anyone skilled in the art to construct an exhaust gas reactor having supporting pins as disclosed. Introduction of exhaust gases and additional air into the reactor chamber provide for a continuation of the reaction begun in an internal combustion engine. The additional reaction before venting of the exhaust gas insures fewer harmful pollutants reaching the atmosphere. For further details concerning employment of this invention in the context of a complete internal combustion engine exhaust system, see my coassigned patent application filed concurrently herewith bearing attorney's docket number OR-5490, entitled "Thermal Exhaust Gas Reactor", now Ser. No. 332,505.

The embodiments of the invention in which an exclusive property or privilege is claimed are defined as follows:

1. In an elongated exhaust gas reactor in which an elongated reactor chamber is mounted within a surrounding shell by supporting pins that are aligned axially and that connect the chamber to the shell at their ends, the reactor having exhaust gas inlets extending through the shell and into the chamber, the improvement which comprises supporting pins that are anchored to the shell and positioned slidably into the reactor chamber, said supporting pins having passages through them providing communication between the reactor chamber interior and the reactor shell exterior.

* * * * *